Aug. 4, 1936.  V. A. KJÆR  2,049,841
CHAIN
Filed Dec. 12, 1932  2 Sheets-Sheet 1
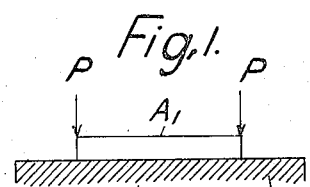
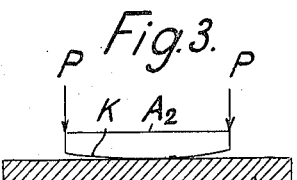
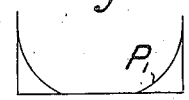
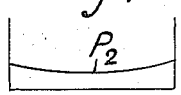
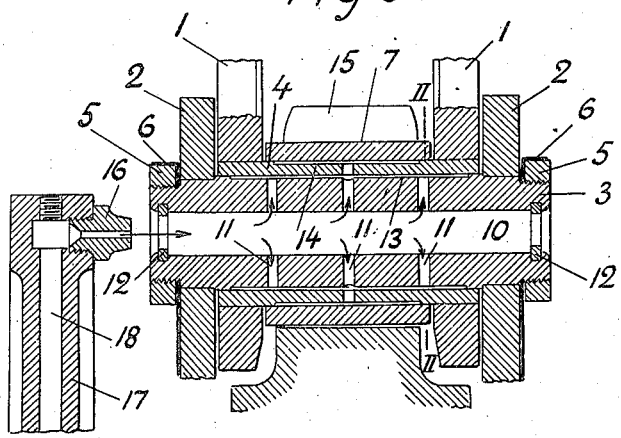
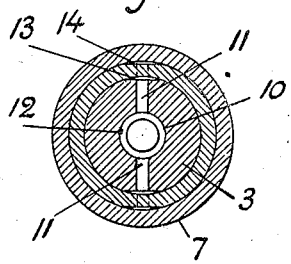
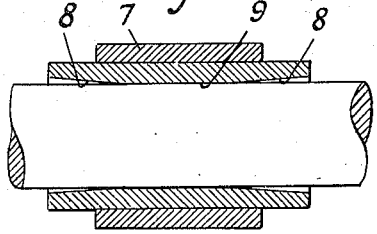
V. A. Kjaer
INVENTOR Aug. 4, 1936.   V. A. KJÆR   2,049,841
CHAIN
Filed Dec. 12, 1932   2 Sheets-Sheet 2

Patented Aug. 4, 1936

2,049,841

UNITED STATES PATENT OFFICE 2,049,841

CHAIN

Viggo Axel Kjær, Copenhagen, Denmark

Application December 12, 1932, Serial No. 646,937
In Denmark January 12, 1932

6 Claims. (Cl. 74—251)

This invention relates to an improved construction of driving chain of the kind in which the links consist of plates connected together by pins and bushes, and the object of the invention is to provide a chain which is particularly durable and capable of withstanding heavy wear and which is adaptable for the transmission of power in engine power plants.

The construction of satisfactory chains of this kind is aggravated in particular by the difficulty of avoiding high surface pressures between the different parts of the chain, especially at those parts where there is a sliding movement as well as pressure.

The chain of the present invention is made in such a way that the pressure on the sliding surfaces is spread over as large a surface as possible, and at the same time care is taken that the particular surfaces are effectively lubricated.

According to the invention one or both of the cooperating surfaces of the pin and bush in the finally assembled chain have such a shape that the tension on the chain between successive links is transmitted from the bush to the pin with a surface pressure distributed uniformly or substantially uniformly over their opposed bearing surfaces. This is attained by so constructing the pin or bush or both that the generatrices of the external surface of the pin or inner surface of the bush or both surfaces have the form of convex curves in the finally assembled chain, the term "convex curves" being understood herein to include not only uniformly bent curves, but also curves composed wholly or in part of short straight lines. As will hereinafter appear, the conditions are such that in order to attain entirely uniform distribution of the pressure, generatrices would have to be used in the form of uniformly bent curves, while in practice and for manufacturing reasons generatrices are preferably used which are composed of short straight lines, in which manner an approximately uniform distribution of the surface pressure can be obtained.

In carrying out the invention the middle part of the inner surface of the bush, or alternatively the outer surface of the pin may consist of a cylindrical surface, while each of the ends may be formed from one or more conical surfaces or two or more semi-cylindrical surfaces, the axes of which are at a slight angle to both sides of the axis of the middle cylindrical portion, the said axes lying in a plane which coincides or approximately coincides with the plane of the chain links. The latter construction can be produced by holding the cutting tool at an angle to one or the other side of the axis of the middle portion. The said construction is possible because the angle between the chain links on the chain wheels is itself so small that it is of no consequence in this connection.

The bushes are preferably mounted on hollow pins and the diameters are made so large that the bushes can be made of brass or like bearing metal without the permissible surface pressures for such metal being exceeded. The use of brass has the advantage that the chain can be more cheaply manufactured owing to the greater ease of working brass.

The hollow pins may furthermore be provided with transverse bore holes for supplying lubricating oil from the interior. The lubricating oil is supplied through one or more injection nozzles, which are fitted opposite the spaces between the teeth of one or more of the chain wheels and which rotate with the wheel. The lubricating oil is then forced out of the hollow interior of the pin by the centrifugal force through the transverse bore holes to the outer surface of the pin bearing against the inner surface of the bush.

Owing to the uniform distribution of the surface pressure, the invention has the advantage that the danger of friction between bush and pin is greatly reduced. This advantage is still further increased by the fact that effective oiling of the bearing surfaces between the bush and pin is attained. This oiling is particularly good, because the dimensions of the bush are not larger than would allow the bush to yield resiliently on the chain links passing from the tensioned to the slack chain part and vice-versa, so that it exerts a pumping action on the lubricating oil between the bush and pin.

The invention is illustrated in the accompanying drawings whereon

Figs. 1–4 are a few diagrams for explaining more clearly the fundamental feature of the invention.

Fig. 5 is a cross-section through one construction of part of a chain link according to the invention and with the injection nozzle for oiling purposes.

Fig. 6 is a section on the line II—II of Fig. 5.

Fig. 7 is a longitudinal section through a bush with associated roller.

Figure 8:
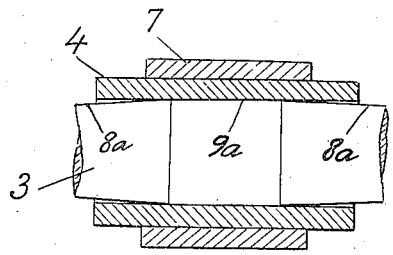
Figs. 8, 9 and 10 are views similar to Fig. 7 showing three further modifications of the invention.

In Fig. 1, the reference $A_1$ designates a beam with a flat underside which rests on a flat supporting surface B. The beam $A_1$ is loaded at each end with a force P at right angles to the supporting surfaces. There is thus a surface pressure on the supporting surface and the size and distribution of this pressure over the supporting surface is indicated by the curve $P_1$ in Fig. 2. The surface pressure is greatest at the ends and drops rapidly towards the middle.

In Fig. 3 a beam is illustrated which is loaded in the same way as in Fig. 1; its underside however is made with a slight curve K, so that the beam when unladen rests only on a small part of the surface midway between the ends. By loading it with the two forces P, the beam $A_2$ on account of its elasticity is caused to rest against the supporting surface in such a manner that the distribution of pressure thereon is more uniform as indicated by the curve $P_2$ in Fig. 4, where the largest ordinate is considerably smaller than the largest ordinate of the curve $P_1$.

Instead of constructing the underside of the beam as a convex curve, a corresponding result could be obtained with a beam as $A_1$ of Fig. 1 if the supporting surface B were given a correspondingly uniformly curved surface, following a convex curvature.

Fig. 5 shows the link plates 1 and 2 of two successive links of a roller chain. The plates are connected together by a pin 3 and a bush 4. The pin 3 is fitted with nuts 5 which are secured by washers or plates 6 with raised or bent over edges. A freely rotatable roller 7 is fitted on the bush 4. In Fig. 7 the inner generatrix of the bush 4 is for the sake of clearer illustration indicated with a very exaggerated curvature, whereas the invention is really concerned with only very slight deviations from the cylindrical form. In order to render the manufacture as simple as possible, the inner surface of the bush is composed of two conical surfaces 8 which are united to the same cylindrical surface 9.

In Figs. 5 and 6 a longitudinal bore 10 is shown in the pin 3, and transverse bore holes 11 are provided. Rings 12 prevent the outflow of lubricating oil. On both sides of the pin 3 and bush 4 there are small grooves 13 and 14 acting as lubricating passages.

The chain is carried by a chain wheel 15 opposite the spaces between the teeth of which are arranged a series of injection nozzles 16 which in the example illustrated are carried by a disc 17 rotating with the chain wheel 15. The lubricating oil is supplied through passages 18 from the lubricating oil system. The device operates in such a manner that the bush 4 rests under load on the chain link against the pin 3. The tension transmitted from the plates 1 is consequently distributed owing to the conical surfaces 8 approximately uniformly over the whole bearing surface between the bush and the pin. As soon as there is no load on the chain link, e. g. because it passes over on to the slack side of the chain, the bush again straightens out and thus promotes the oil circulation. So long as the chain link is on the chain wheel, it receives adequate supply of lubricating oil from the injection nozzle 16, the oil being retained by the rings 12 and forced out by the centrifugal action to the bearing surface between the bush and the pin through the bore holes 11 and grooves 13, 14.

Instead of constructing the bush 14 according to Fig. 7, the outer surface of the pin could be formed in a corresponding manner, i. e. with a generatrix in the shape of a convex curve. Both constructions may, if desired, be combined.

The invention can also be applied to such double chains where each link consists of two juxtaposed links as that according to Fig. 5, the pin passing through both bushes and the two adjacent link plates being united in a single heavier central link plate. Thus, the pin may be considered as a beam held in the middle and with a simple support at each end, so that the elastic line or rod line will be different from that for a normal chain as in the chain according to Fig. 5. The elastic line can nevertheless be calculated and the depending surfaces between the bushes and the pin can be constructed according thereto.

Fig. 8 shows a construction in which the inner surface of the bush 4 is cylindrical while the outer surface of the pin is composed of two inclined or conical surfaces $8^a$, the medial portion $9^a$ of the pin being of cylindrical form.

Figure 9:
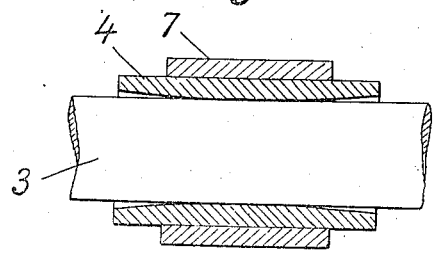

According to Fig. 9, the pin 3 is cylindrical while the inner surface of the bush 4 has the shape of a surface of revolution, the generatrix of which is a convex curve.

Figure 10:
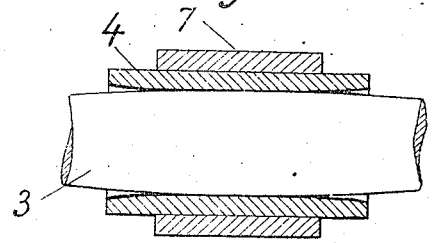

According to the construction shown in Fig. 10, both of the cooperating surfaces of the pin 3 and the bush 4 are surfaces of revolution, the generatrixes of which are both convex curves.

I claim:

1. A chain composed of apertured links arranged in pairs, pins and bushes connecting said links, the links of one pair receiving the ends of one of said pins in the apertures thereof and the links of an adjacent pair receiving the opposite ends of one of said bushes in the apertures thereof, at least one of the cooperating surfaces of the pin and bush having an uncylindrical shape whereby said surfaces when not under load, do not make contact at the ends of the bush but only over a portion intermediate the ends, said shape being further so proportioned to the elastic deformation involved by the stresses occurring by normal load on the chain, that substantially complete contact over the full length of the pin and bush occurs when the chain is under load, thus producing a substantially uniform distribution of the surface pressure between the bush and the pin.

2. A chain composed of apertured links arranged in pairs, pins and bushes connecting said links, the links of one pair receiving the ends of one of said pins in the apertures thereof and the links of an adjacent pair receiving the opposite ends of one of said bushes in the apertures thereof at least one of the cooperating surfaces of the pin and bush having the shape of a surface of revolution, the generatrix of which constitutes a convex curve substantially corresponding to the elastic deformation which is involved when the pin and bush are subjected to the stresses occurring under normal load on the chain.

3. A chain composed of apertured links arranged in pairs, pins and bushes connecting said links, the links of one pair receiving the ends of one of said pins in the apertures thereof and the links of an adjacent pair receiving the opposite ends of one of said bushes in the apertures thereof, at least one of the cooperating surfaces of the pin and bush being constituted only at its middle part by a cylindrical surface, while its ends consist of conical surfaces, the generatrixes of which form such small angles with the axis of the cylindrical middle part that the shape of the said surface mainly corresponds to the elastic deformation which is involved when the pin and bush are subjected to the stresses occurring under normal load on the chain, and substantially complete contact is thus obtained between pin and bush when the chain is under load.

4. A chain composed of apertured links arranged in pairs, pins and bushes connecting said links, the links of one pair receiving the ends of one of said pins in the apertures thereof and the links of an adjacent pair receiving the opposite ends of one of said bushes in the apertures thereof, the ends of at least one of the cooperating surfaces of the pin and the bush consisting of surfaces constituted by portions of cylindrical surfaces, the axes of which are slightly inclined to one another and to the central axis of the pin, said portions of cylindrical surfaces being joined to one another by substantially flat surfaces.

5. A chain composed of apertured links arranged in pairs, pins and bushes connecting said pins, the links of one pair receiving the opposite ends of one of said pins in the apertures thereof and the links of an adjacent pair receiving the opposite ends of one of said bushes in the apertures thereof, the pins being cylindrical, each bush having an internal bearing surface of uncylindrical shape corresponding to the shape which the bearing surface of the pin gets due to the elastic deformation involved when the pin is subjected to the stresses occurring under normal load on the chain, so that during normal working of the chain the pin and the bush will bear substantially completely against each other, over the whole length of the pin and bush.

6. A chain composed of apertured links arranged in pairs, pins and bushes connecting said links, the links of one pair receiving the ends of one of said pins in the apertures thereof and the links of an adjacent pair receiving the opposite ends of one of said bushes in the apertures thereof, the bushes being cylindrically bored, each pin having an uncylindrical bearing surface, the shape of said surface being proportioned after the elastic deformation involved when the pin is subjected to the stresses occurring under normal load on the chain, so that during normal working of the chain the pin and the bush will bear substantially completely against each other, over the whole length of the pin and bush.

VIGGO A. KJÆR.